(No Model.) 2 Sheets—Sheet 1.
J. H. SMITH.
CONFECTIONERY MACHINE.

No. 432,912. Patented July 22, 1890.

Witnesses
E. P. Ellis
B. Brockett

Inventor
Jos. H. Smith
By his Attorneys
Lehmann & Pattison (No Model.) 2 Sheets—Sheet 2.

J. H. SMITH.
CONFECTIONERY MACHINE.

No. 432,912. Patented July 22, 1890.

Witnesses
E. P. Ellis,
R. Brockett.

Inventor.
Jos. H. Smith,
By his Attorneys
Lehmann & Pattison.

UNITED STATES PATENT OFFICE.

JOSEPH H. SMITH, OF BALTIMORE, MARYLAND.

CONFECTIONERY-MACHINE.

SPECIFICATION forming part of Letters Patent No. 432,912, dated July 22, 1890.

Application filed March 29, 1890. Serial No. 345,826. (No model.)

*To all whom it may concern:*

Be it known that I, JOSEPH H. SMITH, of Baltimore, in the State of Maryland, have invented certain new and useful Improvements in Confectionery-Machines; and I do hereby declare the following is a full, clear, and exact description of the invention, such as will enable others skilled in the art to which it pertains to make and use it, reference being had to the accompanying drawings, which form part of this specification.

My invention relates to an improvement in confectionery dropping and running machines; and it consists in, first, a receiver or holder in which the material is placed, and which is provided with a perforated bottom having its openings countersunk or inclined at one side, in combination with a cut-off having correspondingly-shaped openings through it, but having the inclined sides of the openings extending in the reverse direction from those in the bottom of the receiver, and a mechanism for operating the slide or cut-off, the said mechanism being made adjustable, so as to regulate the amount of material that shall be dropped; second, the combination of the receiver, a follower for forcing out the material through the perforated bottom, a cut-off placed in the bottom of the receiver, a mechanism for operating the cut-off, and a separate mechanism for operating the chains which carry the receiving trays or molds, all of which will be more fully described hereinafter.

The object of my invention is to produce a confectionery and dough running and dropping machine by means of which gum-work, marsh-mallow work, soft-dough work, and cream-work can be dropped a full tray or mold at a time, and which will operate upon gum material from which the moisture has been cooked, so that after being dropped there is no necessity for kiln-drying the work for several days, as has heretofore been the case.

Figure 1:
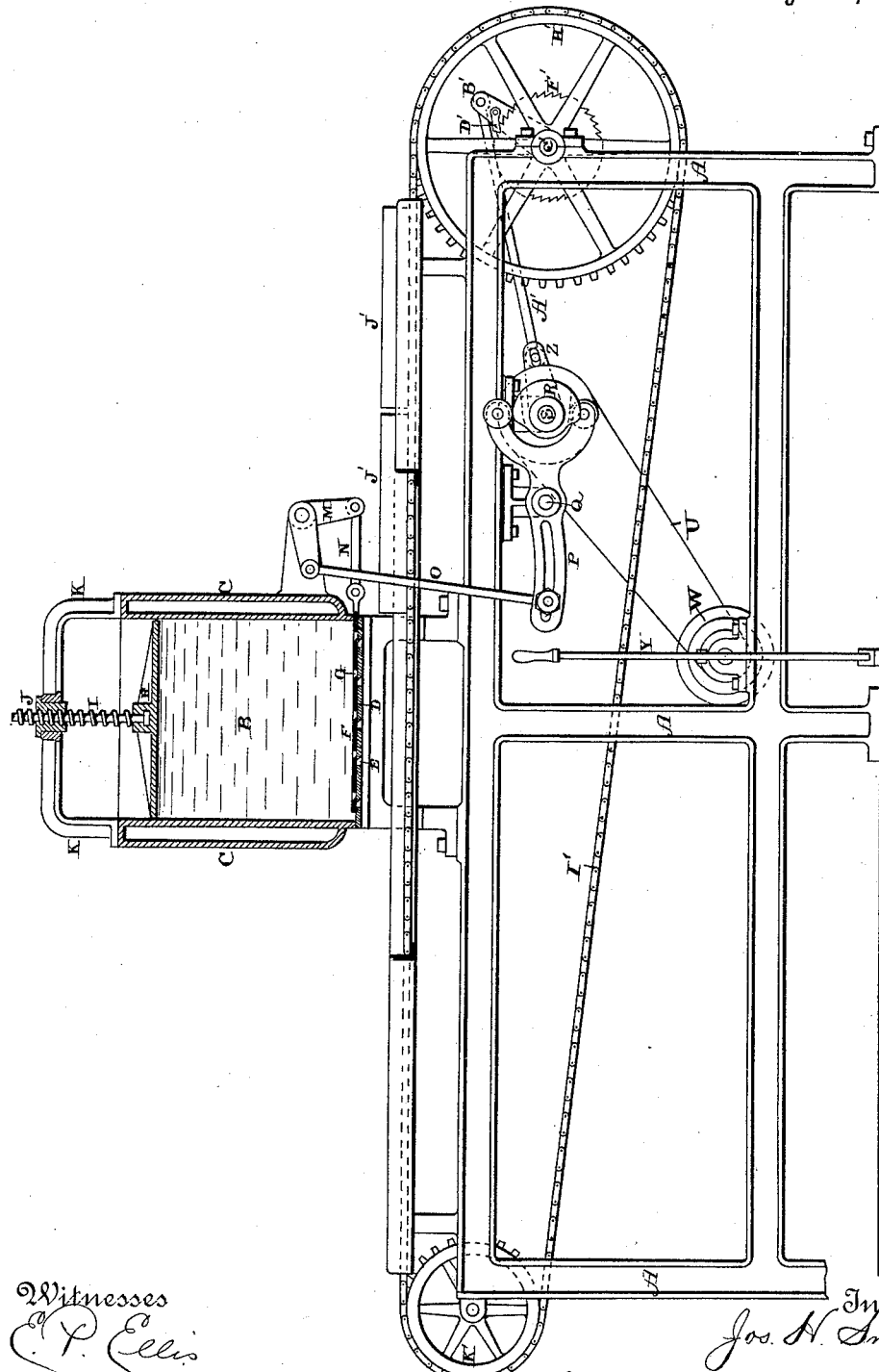
Figure 2:
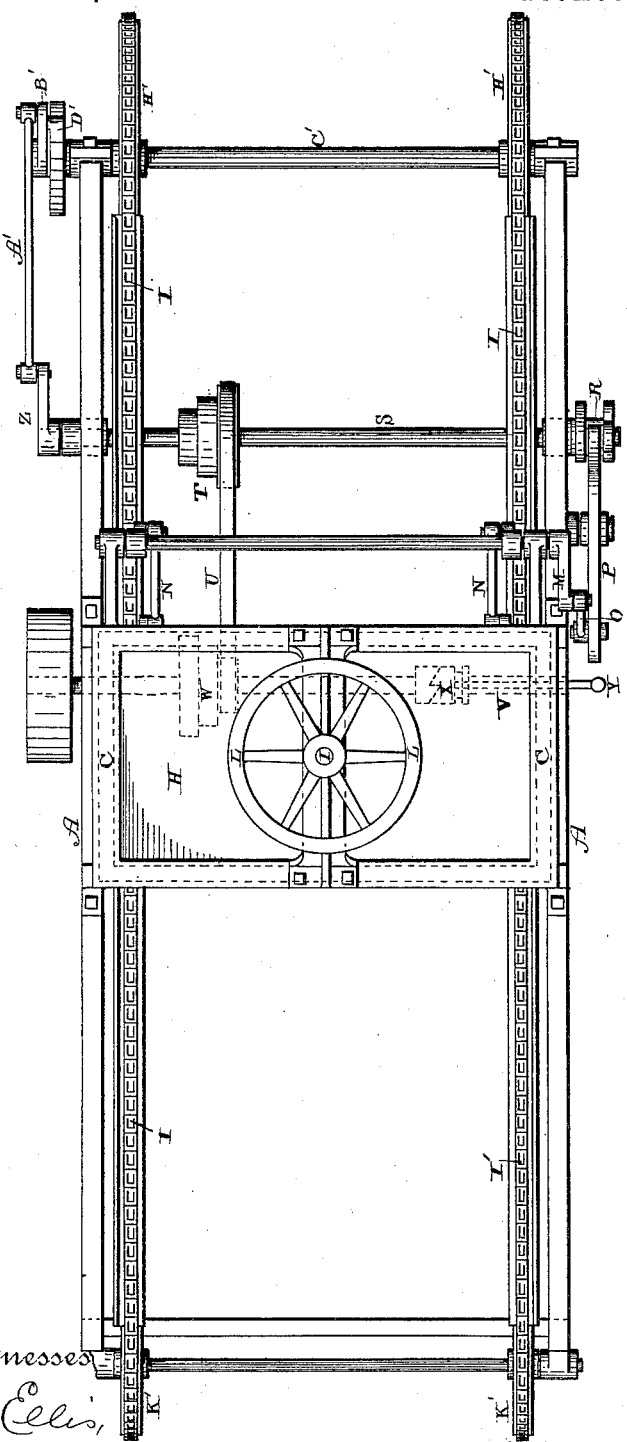
Figure 5:
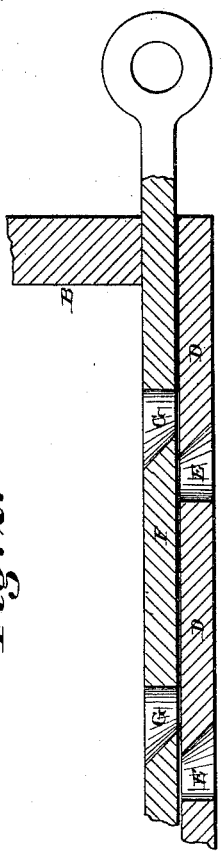

Figure 1 is a side elevation of a machine embodying my invention, partly shown in section. Fig. 2 is a plan view of the same. Fig. is a detail view showing the perforated bottom and the cut-off.

A represents a frame-work of any suitable construction that may be preferred, and above the center of which is mounted the receiver B, which is provided with a steam-jacket C, in the usual manner. The confectionery material of whatever kind is placed in this receiver, which is provided with the perforated bottom D. There will be any desired number of openings through the bottom, and each opening E will be made of the shape shown. One side of the opening, as shown in Fig. 3, is vertical, while the other side is inclined, slanted, or countersunk, so as to have an outwardly and downwardly inclined surface upon the opposite side, so as to allow a free discharge of the material after it has been cut off by the slide or cut-off F, which is provided with similarly-shaped openings G. The openings G through the slide, which correspond in number to those through the bottom D, also have vertical and inclined sides, as shown; but these openings G are placed in a reverse position from those made through the bottom D, so that not only will the material be cut cleanly off, but allowed to drop freely.

The vertical edges of the two openings E G form the cut-offs for the material as the cut-off F is moved back and forth at regular predetermined times by its operating mechanism. This cut-off F is placed in a groove in the bottom of the receiver and is held pressed tightly against the bottom by the material above it, so that the bottom and the cut-off are always in close contact with each other, thus insuring a clean cut of the material. The groove prevents the cut-off F from ever rising and thus becoming separated from the bottom, whereby the material might possibly get between the two and thus prevent perfect work from being done. The material is forced through the cut-off F and bottom D by the follower H, which is operated by a screw I, which passes through a loose removable box or nut J, placed in the bearing K, which rises from the top of the receiver, as shown in Fig. 1. The screw I is provided with a hand-wheel L at its upper end, and which must be operated by hand from time to time by the operator for the purpose of forcing the material in any desired quantities through the openings.

When it is desired to remove the follower H from the receiver, it can be lifted, carrying the nut, which must first be unlocked, and the screw with it, and thus save the time of operating the screw to raise the follower, as would otherwise be the case. This follower is only needed when the material is so heavy that it will not flow freely through the openings, and therefore need not always be brought into operation.

The cut-off F has connected to its outer end a connecting link or rod N, and to the outer end of this rod is attached the L-shaped lever or crank M, which has the connecting-rod O attached to its upper end. The lower end of this rod O is clamped in any desired position to the slotted rocking lever P, which is pivoted upon a suitable hanger Q. The slot through the inner end of this lever P will be made of any desired length, and by adjusting the lower end of the rod O the cut-off F can be given a slower or quicker movement, as may be desired, and thus regulate the amount of material to be dropped at the will of the operator. The outer end of the lever P is pronged or forked, as shown, and provided with friction-rollers, so as to engage with opposite sides of the eccentric R, formed upon one end of the shaft S, which is provided with a cone-pulley T, and which receives its motion through the belt U from the driving-shaft V, which is provided with a corresponding cone-pulley W, as shown. This driving-shaft V is provided also with a clutch X, which is operated by the lever Y, and by means of which the machine can be quickly started or stopped at the will of the operator.

Connected to the opposite end of the shaft S from the eccentric R is a crank Z, to which the operating rod A' is loosely fastened. The outer end of this rod A' is loosely connected to the lever B', which is pivoted upon the end of the shaft C' and carries a pawl or dog D', which engages with the ratchet-wheel F', also secured to the shaft C'. To this shaft C' are secured the two large chain-wheels H', around which pass the chains I', upon which the trays or molds J' are placed. These wheels H' are about four times as large as the wheels K', around which the chains also pass, and hence, owing to the construction here shown, a much longer movement can be given to the chains when so desired than could be done if the wheels H' K' were the same size. By this means the distance that the trays or molds shall be moved can be regulated at will.

Heretofore gum-work has required such an amount of moisture, so as to enable it to be run or dropped freely, that after being dropped or run it had to be taken to kilns and dried for several days, in order to evaporate the moisture and give it the proper body or consistency. This necessitates a great expense in fuel and labor of different kinds and greatly increases the cost of the material. By means of the construction here shown I am enabled to freely run or drop gum material which has had all the superfluous moisture cooked out of it, and hence the material is ready to be shipped the following day after being dropped without the expense and trouble of kiln-drying.

Not only will this machine enable the work of ten men to be done in a single day, but I am enabled to dispense with over two-thirds of the trays or molds which are required with the ordinary machines now in use, and effect a very great saving in the starch which has heretofore been required in molding for use in the trays. The cam R and the crank Z are placed upon the shaft S in such relation to each other that when the cam is engaging the forked end of the lever P, and thus operating the cut-off through the medium of the rods and cranks connected therewith, the crank Z is moving toward the ratchet F', and the pawl D' slides freely over the said ratchet without moving the wheels H', around which the chains I' pass, whereby the trays J' are still, while the cut-off is in a position to allow the material to pass through the bottom of the receiver, and when the crank Z is moving away from the ratchet F' and the pawl D' engaging the said ratchet, so as to cause the wheels H' to revolve and with them the chains upon which the trays are placed, the cam R is out of engagement with the forked end of the lever P, and the cut-off thus at rest and in a position to prevent the material from passing through the bottom of the receiver while the trays are moving.

Having thus described my invention, I claim—

1. The combination, with the receiver having a bottom provided with flared perforations, of a cut-off provided with flared perforations and mechanism for operating the cut-off, substantially as shown.

2. The combination of the receiver, the support K, extending above it, the follower H, the screw I, and the removable nut or bearing J, whereby the follower may be lifted from the receiver, substantially as set forth.

3. In a confectionery-machine, the combination of a receiver provided with a perforated bottom, a perforated cut-off, and a mechanism for operating the cut-off, with the wheels, the chains which are passed around the wheels and upon which the trays are placed, and a mechanism for operating the chains after the cut-off has been operated by its mechanism, so as to cause the dropping to take place, substantially as specified.

In testimony whereof I affix my signature in presence of two witnesses.

JOS. H. SMITH.

Witnesses:
F. A. LEHMANN,
A. S. PATTISON.